(12) United States Patent  
Pemberton-Pigott

(10) Patent No.: US 9,096,093 B2
(45) Date of Patent: Aug. 4, 2015

(54) CAMERA-EQUIPPED STYLUS PEN CAP

(71) Applicant: Research In Motion Limited, Waterloo (CA)

(72) Inventor: Nigel Patrick Pemberton-Pigott, Breslau (CA)

(73) Assignee: BlackBerry Limited, Waterloo, Ontario (CA)

( * ) Notice: Subject to any disclaimer, the term of this patent is extended or adjusted under 35 U.S.C. 154(b) by 299 days.

(21) Appl. No.: 13/644,330

(22) Filed: Oct. 4, 2012

(65) Prior Publication Data

US 2014/0099153 A1    Apr. 10, 2014

(51) Int. Cl.
*B43K 29/00*    (2006.01)
*B43K 23/12*    (2006.01)
*B43K 29/10*    (2006.01)
*B43K 29/08*    (2006.01)
*H04N 5/225*    (2006.01)

(52) U.S. Cl.
CPC .............. *B43K 23/12* (2013.01); *B43K 23/126* (2013.01); *B43K 29/003* (2013.01); *B43K 29/004* (2013.01); *B43K 29/08* (2013.01); *B43K 29/10* (2013.01); *H04N 5/2256* (2013.01); *H04N 5/2258* (2013.01)

(58) Field of Classification Search
CPC ........ B43K 29/10; B43K 29/04; B43K 29/08; B43K 29/003
USPC ........... 401/195, 98, 213, 202, 243–247, 269; 345/179; 382/314; 348/207.99
See application file for complete search history.

(56) References Cited

U.S. PATENT DOCUMENTS

| 7,129,986 | B2 | 10/2006 | Wang et al. |
| 7,239,306 | B2 | 7/2007 | Fåhraeus et al. |
| 7,401,992 | B1 | 7/2008 | Lin |
| 2004/0109722 | A1 | 6/2004 | Huang |

(Continued)

FOREIGN PATENT DOCUMENTS

| CN | 202219678 U | * | 5/2012 |
| EP | 1967386 A1 |   | 9/2008 |
| WO | 01/31570 A2 |   | 5/2001 |

OTHER PUBLICATIONS

Dane-Elec; Zpen User's Guide; Version 4.0; available at least as of Aug. 23, 2012; 49 pages.

(Continued)

*Primary Examiner* — Jennifer C Chiang
(74) *Attorney, Agent, or Firm* — Thomas Grzesik; Fleit Gibbons Gutman Bongini & Bianco P.L.

(57) ABSTRACT

A stylus pen cap has at least one camera disposed at least partially therein. The pen cap can further include a light source (such as an infrared light source) that directs light outwardly of the pen cap to the stylus. The pen cap can further include an electrical connector that operably couples to the camera(s) and conveys captured-image data to an outboard device of choice. The pen cap can include a pocket clip that comprises the electronic connector. The pocket clip can include a flexible joint (such as but not limited to a universal joint) to thereby permit the camera(s) to be oriented and aimed as desired even while electrically connected to an outboard device.

15 Claims, 2 Drawing Sheets

(56) References Cited

U.S. PATENT DOCUMENTS

| | | |
|---|---|---|
| 2004/0218051 A1* | 11/2004 | Hsu .......................... 348/207.99 |
| 2007/0003168 A1 | 1/2007 | Oliver |
| 2010/0085471 A1 | 4/2010 | Craven-Bartle |
| 2011/0310066 A1 | 12/2011 | Fermgård et al. |

OTHER PUBLICATIONS

Extended European Search Report from related European Patent Application No. 12187168.5 dated Mar. 19, 2013; 6 pages.

* cited by examiner

CAMERA-EQUIPPED STYLUS PEN CAP

RELATED APPLICATIONS

This application is related to co-pending and co-owned U.S. patent application Ser. No. 13/644,278, entitled A STYLUS BODY HAVING TWO OR MORE SPHERES COAXIALLY AFFIXED THERETO and filed month day, year, which is incorporated by reference in its entirety herein

FIELD OF TECHNOLOGY

The present disclosure relates to styli that serve as a user-input interface for an electronic device.

BACKGROUND

Stylus-based user interfaces are known in the art. Generally speaking, a stylus comprises a hand-held writing utensil that often (but not exclusively) has a pencil-like elongated form factor and that includes at least one pointed end configured to serve as a writing tip by interacting with a scribing/writing surface. Using a stylus offers a variety of advantages over a fingertip including the opportunity for increased precision as well as an expression modality that accords with the user's own past experience with a pencil or pen.

Some styli are operationally passive while others are active and interact with a stylus-location sensor in some non-passive way. Generally speaking, stylus readers usually accommodate only a very limited application setting as regards use of the stylus itself. For example, use of the stylus may be limited to only a specific scribing surface or area. In cases where such a limitation does not apply, the stylus itself often includes considerable circuitry and programming to permit the stylus itself to be self-monitoring in these regards. Accordingly, typical prior art stylus solutions tend to be either highly limiting with respect to where and how a user can employ the stylus and/or represent a technically complicated and relatively expensive solution.

DETAILED DESCRIPTION

Figure 1:
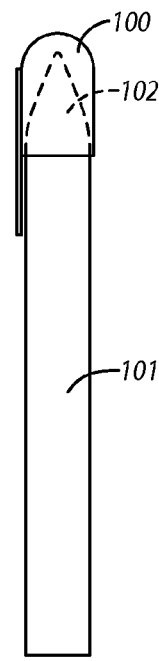
FIG. 1 is a front elevational view in accordance with the disclosure.

The following describes an apparatus pertaining to a stylus pen cap having at least one camera disposed at least partially within the stylus pen cap. A corresponding stylus can have its writing tip snuggly stored within the stylus pen cap during periods of nonuse. During use, the stylus is removed from the stylus pen cap. The stylus pen cap can then be positioned to place the stylus within the field of view of the aforementioned camera. Captured images of the stylus, in turn, can be utilized to facilitate tracking at least a portion of the stylus (such as the writing tip) and using that tracking information as input to, for example, a corresponding display.

By one approach the pen cap can include at least two such cameras. The use of a plurality of cameras can sometimes better facilitate the aforementioned tracking of the stylus. If desired, the pen cap can further include a light source (such as an infrared light source) that directs light outwardly of the pen cap and into the aforementioned field of view to thereby illuminate the stylus. Illuminating the stylus in this way can facilitate, for example, capturing the aforementioned images of the stylus during use.

By one approach the pen cap can further include an electrical connector. This electrical connector can be operably coupled to the camera(s) and can be configured to convey captured-image data to an outboard device of choice such as a so-called smartphone, a tablet/pad-styled computer, a laptop computer, and so forth. If desired, the pen cap can include a pocket clip that comprises the electronic connector. By one approach the pocket clip can include a flexible joint (such as but not limited to a universal joint) to thereby permit, for example, the camera(s) to be oriented and aimed as desired even while electrically connected to an outboard device.

Such a pen cap can be utilized with a variety of styli including both passive styli as well as active styli. By one approach the writing tip of the stylus can even comprise an ink-dispensing tip (such as a ball point pen tip). Accordingly, the stylus can be a relatively simple and inexpensive component if desired.

So configured, the user is not constrained to using only a given display surface or other specialized scribing surface. Instead, virtually any surface can serve as a scribing surface including a sheet of paper. The pen cap itself, in turn, can serve as a camera platform that simply passes along its captured images or can, if desired, include its own circuitry and processing capabilities to, for example, analyze the captured images and extract corresponding location/tracking data as regards the stylus.

The teachings are highly flexible in practice and are also highly scalable in that these teachings will accommodate any number (and type) of cameras and virtually any type, size, and shape of stylus. The installation and use of such a pen cap-based stylus tracking system can also be a relatively simple process that requires little user training to effect successfully.

For simplicity and clarity of illustration, reference numerals may be repeated among the figures to indicate corresponding or analogous elements. Numerous details are set forth to provide an understanding of the embodiments described herein. The embodiments may be practiced without these details. In other instances, well-known methods, procedures, and components have not been described in detail to avoid obscuring the embodiments described. The description is not to be considered as limited to the scope of the embodiments described herein.

FIG. 1 presents a pen cap 100 that snuggly receives one end (such as the writing tip 102) of a stylus 101. Pen caps in general are well known in the art and the present teachings are not particularly limited in these regards. Generally speaking, the fit of a pen cap to a stylus is "snug" in that the pen cap will remain in place on the stylus through friction. This friction can be owing to a tight conformal fit between some part of the exterior of the stylus and the interior of the pen cap and/or due to a snap fit mechanism of choice. These teachings will also accommodate using a threaded connection (or any other connection mechanism) to temporarily (during non-use) retain the stylus portion within the pen cap 100. The pen cap 100 can be formed of one or more materials of choice with plastic and/or metal being particularly useful for many application settings.

By one approach the writing tip 102 can comprise a sharply pointed extension of the material that comprises the stylus 101 itself. By another approach the writing tip 102 can be somewhat blunted to provide a larger point of contact with the scribing surface. And by yet another approach these teachings will accommodate having the writing tip 102 comprise, at least in part, a ball point pen tip such that the stylus 101 is able to write on an appropriate surface (such as paper) using ink.

Both the pen cap 100 and the stylus 101 can have any of a wide variety of form factors. As the present teachings are not particularly sensitive to any particular choices in these regards, for the sake of brevity further elaboration in these regards is not presented here. It will be noted, however, that the stylus/pen cap can be further configured to permit the pen cap 100 to also fit snuggly on the opposite end of the stylus 101 if desired. The stylus 101 can also be configured to feature a writing tip at each of its ends if desired.

Figure 2:
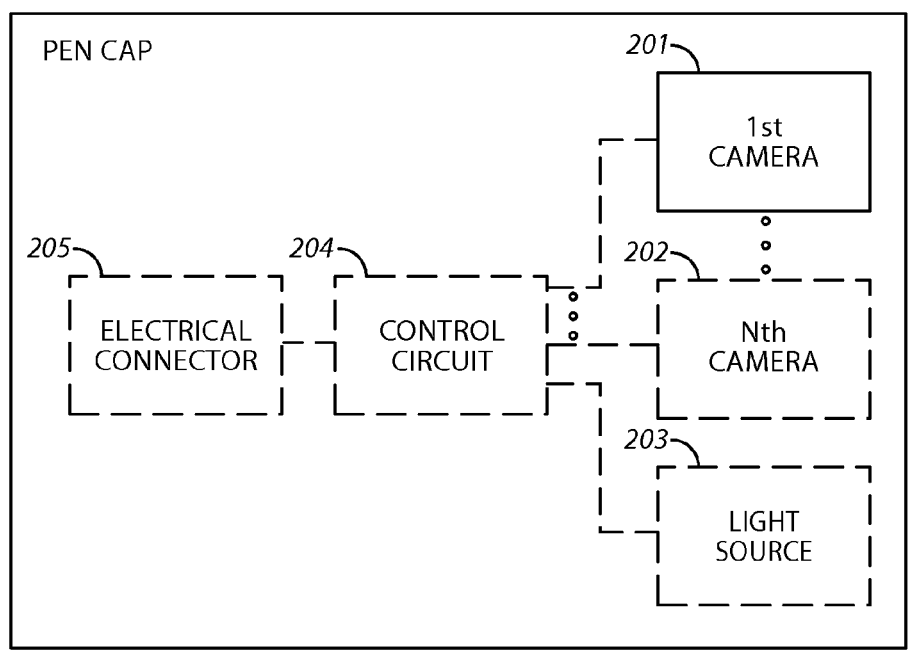
FIG. 2 is a block diagram in accordance with the disclosure.

Referring to FIG. 2, the pen cap 100 can include one or more active components. For example, the pen cap 100 can include at least one camera 201 disposed at least partially therein. Generally speaking, the lens (not shown in this figure) for the camera 201 will typically be positioned in or somewhat above or below a corresponding cavity through an exterior wall of the pen cap 100. So configured, the camera 201 can capture images of things and events that are external to the pen cap 100. Generally speaking, an image-capture rate of about thirty frames per second, for example, will serve well for these purposes.

As noted above the pen cap 100 can include more than one such camera such as a second camera. FIG. 2 illustrates this approach by inclusion of an optional Nth camera 202 (where "N" comprises an integer greater than "1"). When using multiple cameras these teachings will accommodate using cameras that are essentially identical to one another. These teachings will also accommodate, however, using one or more cameras that are different from another of the cameras. This difference may pertain, for example, to pixel resolution, specific light sensitivities, aperture settings, fields of view, focal lengths, and so forth as desired.

By one approach the pen cap 100 can further optionally include one or more light sources 203 that are disposed at least partially therein. Such a light source can be configured to direct light outwardly of the pen cap 100 and into a field of view of one or more of the aforementioned cameras 201 and 202. Such a configuration, in turn, can serve to at least partially illuminate at least portions of the stylus 101 during use to facilitate capturing useful images of the stylus 101 via the cameras 201/202.

Such a light source 203 can comprise any of a variety of light-emitting components. For many application settings a light-emitting diode will suffice in these regards. These teachings will also accommodate using light sources 203 that emit light at any of a variety of frequencies. For example, in many application settings it can be useful to employ light sources that comprise infrared light sources (presuming, of course, that one or more of the cameras 201 and 202 are able to capture infrared-based images). In such a case, it can be useful to utilize an infrared light source that emits infrared light at a frequency that is out of band with solar light to thereby avoid solar-based interference and noise when monitoring and tracking a stylus 101 in an outdoors setting during the daytime.

If desired, the pen cap 100 can also include an optional control circuit 204. Such a control circuit 204 can comprise a fixed-purpose hard-wired platform or can comprise a partially or wholly programmable platform. These architectural options are well known and understood in the art and require no further description here. This control circuit 204 can be configured (via, for example, corresponding programming as will be well understood by those skilled in the art) to digitally transcribe movement of the stylus 101 relative to the pen cap 100 based upon images of the stylus 101 that are captured by the one or more cameras 201 and 202 that are supported by the pen cap 100.

Such a control circuit 204 can comprise, in part, a corresponding digital memory if desired. This memory can serve, for example, to non-transitorily store the computer instructions that, when executed by the control circuit 204, cause the control circuit 204 to behave as described herein. (As used herein, this reference to "non-transitorily" will be understood to refer to a non-ephemeral state for the stored contents (and hence excludes when the stored contents merely constitute signals or waves) rather than volatility of the storage media itself and hence includes both non-volatile memory (such as read-only memory (ROM) as well as volatile memory (such as an erasable programmable read-only memory (EPROM).)

With continued reference to FIG. 2, this pen cap 100 can also further include an optional electrical connector 205. This electrical connector 205 is operably coupled to one or more of the cameras 201 and 202 (via, for example, the aforementioned control circuit 204) and is configured to convey image data captured by those cameras 201 and 202 (and/or other processed tracking/movement information when available) to a corresponding off-board device (not shown).

There are numerous electrical connectors known in the art and these teachings are not overly sensitive to any particular selections in these regards. For many application settings it can be useful if the electrical connector 205 comprises a Universal Serial Bus (USB)-compatible electrical connector as are known in the art. This can include, without intending to suggest any particular limitations in these regards, a micro-USB connector or a micro-High-Definition Multimedia Interface (HDMI).

Figure 3:
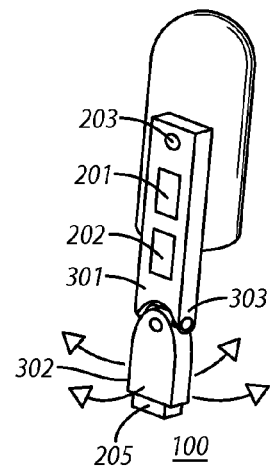
FIG. 3 is a perspective view in accordance with the disclosure.

Referring to FIG. 3 the pen cap 100 can further include, if desired, a pocket clip 301. Pocket clips as comprise a part of a pen cap are well known in the art and typically serve to captivate pocket-forming fabric between itself and the stylus 101 when the latter is disposed within a user's shirt pocket (not shown). Accordingly, this pocket clip 301 extends downwardly below the lower periphery of the pen cap 100 and can also include a corresponding outboard portion on the side of the pen cap 100.

By one approach, and as illustrated, the aforementioned cameras 201 and 202 as well as the light source 203 can be disposed at least partially within such a pocket clip 301. For many pen cap 100 form factors such an approach can be advantageous in that the pocket clip 301 may offer a larger space to house such components than a pen cap 100 that lacks such a clip.

If desired, this pocket clip 301 can also comprise the aforementioned electrical connector 205. In particular, by one approach the electrical connector 205 can extend outwardly of the end portion 302 of the pocket clip 301.

If desired, and as illustrated, the pocket clip 301 can include a flexible joint 303 to thereby permit the electrical connector 205 to be flexibly positioned with respect to the pen cap 100. The present teachings will accommodate any of a wide variety of flexible joints including joints that permit only some limited amount of movement freedom with respect to a single axis of freedom to universal joints that will permit the end portion 302 of the pocket clip 301 (and hence the electrical connector 205) to be moved ninety degrees or more in essentially any direction and angle.

Figure 4:
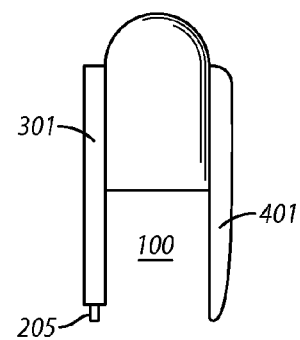
FIG. 4 is a side elevational view in accordance with the disclosure.

Whether the portion of the pen cap 100 that houses one or more of the camera(s) 201 and 202, the light source 203, and the electrical connector 205 is in fact a "pocket clip" can vary as desired. As one illustrative example in these regards, FIG. 4 depicts a pen cap 100 having a working pocket clip 401 that is separate and apart from the so-called pocket clip 301 that includes the foregoing components as described above with respect to FIG. 3.

Figure 5:
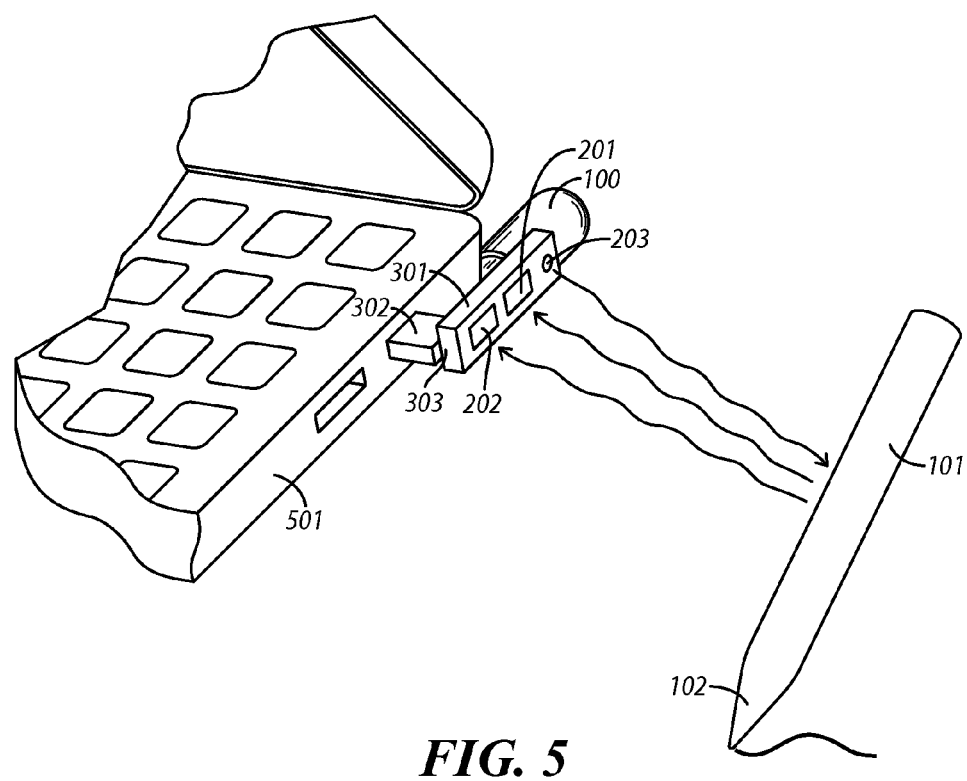
FIG. 5 is a perspective view in accordance with the disclosure.

So configured, such a pen cap 100 can remain installed on the end of a corresponding stylus 101 until a time of need. With reference to FIG. 5, when needed, the user can remove the pen cap 100 from the stylus 101 and insert the electrical connector 205 (not shown in FIG. 5), into a corresponding connector on an outboard device of choice such as the illustrated laptop computer 501.

The upper portion of the pocket clip 301 can then be manipulated with respect to the end portion 302 (via a flexible joint 303 that comprises, in this example, a schematically-represented universal joint) to aim the cameras 201 and 202 (as well as the light source 203) towards the stylus 101 in order to capture corresponding images that can be used to track the movement of the stylus 101 (and in particular the writing tip 102 thereof). It will be appreciated that these teachings will permit the cameras (when the pen cap 100 includes more than one camera) to be selectively oriented horizontally to one another (as illustrated), vertically to one another, or at some other angle of choice. Such flexibility can help to accommodate the specific image requirements of various stylus-tracking algorithms.

There are various approaches and methodologies known in the art to employ a series of captured images of a moving object such as a stylus in order to develop information that follows the movement of at least a portion of that object (such as the object's writing tip). The present teachings are not particularly sensitive to the selection of any given such approach.

So configured, a stylus movement-detector can be readily provided and made available for convenient use with a stylus at a time of need. Since at least some elements of such a detector comprise an integral part of the pen cap that the user employs to protect and/or store or carry the stylus, the user will typically have that detector available wherever and whenever the user wishes to use the stylus to enter scribed information into a corresponding platform such as a laptop or tablet/pad-styled computer. This availability and convenience, in turn, can greatly facilitate the user's successful employment of the stylus in these regards and can therefore contribute to increased user satisfaction.

The present disclosure may be embodied in other specific forms without departing from its essential characteristics. The described embodiments are to be considered in all respects only as illustrative and not restrictive. The scope of the disclosure is, therefore, indicated by the appended claims rather than by the foregoing description. All changes that come within the meaning and range of equivalency of the claims are to be embraced within their scope.

I claim:

1. An apparatus comprising:
   a pen cap;
   at least one camera disposed at least partially within the pen cap; and
   a control circuit configured to digitally transcribe movement of a stylus relative to the pen cap based upon images of the stylus that are captured by the at least one camera,
   wherein the pen cap comprises a pocket clip, the pocket clip comprising a flexible joint, and wherein the flexible joint comprises a plurality of positions each positioning the at least one camera at a different orientation.

2. The apparatus of claim 1 further comprising:
   at least a second camera disposed at least partially within the pen cap.

3. The apparatus of claim 1 further comprising:
   a light source disposed at least partially within the pen cap.

4. The apparatus of claim 3 wherein the light source comprises an infrared light source.

5. The apparatus of claim 3 wherein the light source is configured to direct light outwardly of the pen cap and into a field of view of the at least one camera.

6. The apparatus of claim 1 further comprising:
   an electrical connector operably coupled to the at least one camera and configured to convey image data captured by the at least one camera.

7. The apparatus of claim 6 wherein the electrical connector comprises a Universal Serial Bus (USB)-compatible electrical connector.

8. The apparatus of claim 6 wherein the electrical connector connects via the flexible joint to the pen cap.

9. The apparatus of claim 1 wherein the flexible joint comprises a universal joint.

10. The apparatus of claim 6 wherein the pocket clip comprises the electrical connector.

11. The apparatus of claim 10 wherein the pen cap further includes at least a second pocket clip.

12. The apparatus of claim 1 further comprising:
    a pen having at least one end thereof configured to store snuggly within the pen cap.

13. The apparatus of claim 12 wherein the one end comprises a writing tip.

14. The apparatus of claim 13 wherein the writing tip includes, at least in part, a ball point pen tip.

15. The apparatus of claim 1, wherein the at least one camera is disposed within the pocket clip and the pocket clip further comprises a light source, and wherein each of the plurality of positions of the flexible joint maintains the light source at a different orientation.

* * * * *